Aug. 2, 1932.  F. M. STADER  1,869,522

EDUCATIONAL APPLIANCE

Filed March 25, 1929  2 Sheets-Sheet 1

INVENTOR
Florence M. Stader
BY Whittemore Hulbert
Whittemore Belknap
ATTORNEYS

Aug. 2, 1932.   F. M. STADER   1,869,522
EDUCATIONAL APPLIANCE
Filed March 25, 1929   2 Sheets-Sheet 2

INVENTOR
Florence M. Stader
BY Whittemore Hulbert
Whittemore & Belknap
ATTORNEYS Patented Aug. 2, 1932

1,869,522

UNITED STATES PATENT OFFICE

FLORENCE M. STADER, OF PLYMOUTH, MICHIGAN

EDUCATIONAL APPLIANCE

Application filed March 25, 1929. Serial No. 349,751.

This invention relates to educational appliances and has particular reference to an educational appliance adapted for testing the speed and accuracy with which a pupil may comprehend any given problem.

An object of this invention is to provide means for displaying to a pupil, or a class of pupils, a series of cards or like members bearing different indicia, said means being operable to successively expose these cards at predetermined intervals, the length of which may be increased or diminished at the will of the teacher.

A further object of the invention is to provide an educational appliance including a casing having a sight opening, and having means for successively positioning a plurality of cards adjacent said sight opening for exposure therethrough, together with means for periodically closing said sight opening, and means for stopping the operation of the card feeding means when all of the cards of a certain series have been displayed.

Other objects of the invention will become more apparent as the following description proceeds, particularly when reference is had to the accompanying drawings wherein Figure 1 is an elevational view, on a greatly reduced scale, of an educational appliance constructed in accordance with the teachings of this invention;

Figure 4 is a sectional view taken substantially on the line 4—4 of Figure 3;

Figure 11:
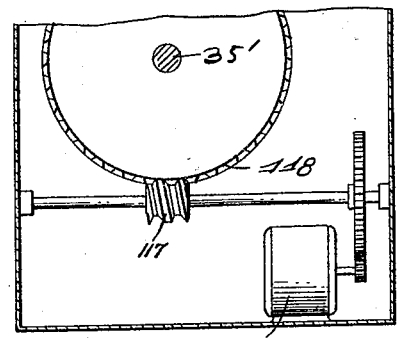
Figure 6:
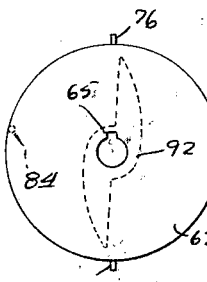
Figure 7:
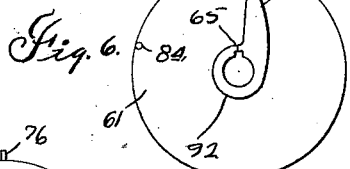
Figure 8:
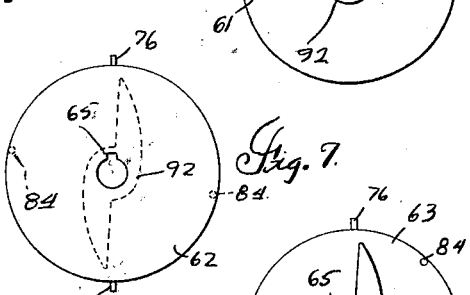
Figure 9:
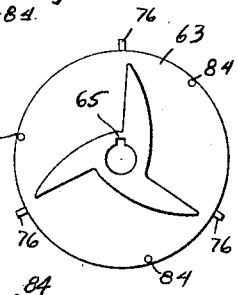
Figure 10:
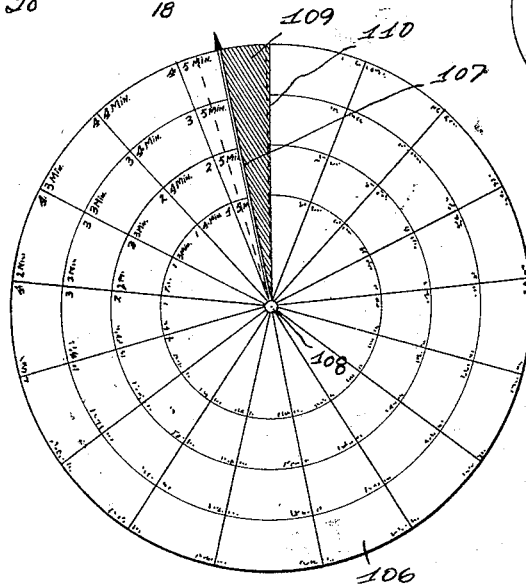

Figures 6 to 9 inclusive, are plan views of the members forming a part of the speed changing mechanism of the device;

Figure 10 is a semi-diagrammatic plan view of an indicator for use in connection with the device; and Figure 11 is a fragmentary sectional view of a slightly modified form of construction.

Referring now particularly to the drawings wherein like reference characters designate corresponding parts throughout all views, it will be noted that the device includes a substantially rectangular casing 15, having the front wall 16, the top and bottom walls 17 and 18 respectively, and the end walls 19 and 20. This casing is adapted to be positioned on a table or like support or suspended in any desired manner in a position where it may be conveniently seen by all of the pupils in a classroom.

The front wall 16, is bent as at 21, inwardly of the casing to form a substantially cylindrical partition 22, which extends longitudinally of the casing to form a cylindrical housing within the casing designated generally by the reference character 23. As illustrated, the free edge of the bent portion of the front wall, may be secured to the upper wall of the casing as at 24. The partition 22 does not extend the full length of the casing, but is terminated at a point spaced from the end 19 of the casing whereby the housing 23 extends from the end 20 of the casing to a point spaced a short distance from the opposite end of the casing.

A partition 25 closes the end of the housing which is spaced from the wall 19, while a door 26, hinged as at 27, to the wall 17, closes the portion of the housing not surrounded by the partition 22. If desired, a circular door 28, may be formed in the wall 20 of the casing to provide access to the end of the cylindrical housing for a purpose hereinafter to be more fully described.

Extending longitudinally of the casing 15, and centrally of the housing 23, is a shaft 35. This shaft is journaled at its one end in a bearing 36, carried by the wall 19, and is journaled at its other end in a bearing 37, carried by an arm 38, secured to the wall 20. This shaft is provided with the radially extending fins 40, spaced apart to form the intermediate card receiving pockets 41, arranged circumferentially of the shaft 35. The fins 40 terminate in a circumferential plane slightly less in diameter than the diameter of the housing 23 so that the outer ends of the pockets are substantially closed by the walls of the said housing. Thus, cards 42, positioned in the pockets 41, will normally be retained in these pockets by the walls of the housing.

Adjacent its forward lower edge, the housing is provided with a discharge slot 43, whereby upon rotation of the shaft 35, the pockets 41, will be successively brought into registration with this discharge slot. Thus, the cards in the pockets may be successively discharged through the discharge slot by periodically rotating the shaft 35 to successively bring each pocket into registration with said slot. For guiding the cards 42, as they are discharged from the pockets, suitable guide-ways 44, are arranged at each end of the slot 43, these guide-ways being adapted to retain the card in upright position and to direct the same to a position parallel with, but spaced from the front wall 16 of the casing.

Extending longitudinally of the front wall 16 of the casing, and adjacent the lower edge of the same, is an opening 50, which constitutes a sight opening. This opening may be closed by glass 51, and is formed in alignment with the lower ends of the guides 44, whereby each card as it is supported in the guides 44, will be visible through the said sight opening.

The operation of the device as thus far described is as follows. Cards 42, bearing suitable indicia, are positioned in the pockets 41. The shaft 35 is then periodically rotated in a manner hereinafter to be more fully described, to successively bring each pocket into registration with the discharge slot 43. As each pocket is brought into registration with this slot, the card in this pocket drops downwardly by virue of the force of gravity and is guided by the guides 44, to a position in alignment with the sight opening 51, whereby the indicia on the card will be exposed through the sight opening. Each card is temporarily supported at the lower ends of the guide members in a manner which will be hereinafter more fully brought out. While the cards as illustrated may each bear a short sentence, it is obvious that the indicia on the cards may be of any character, dependent upon the type of lesson which it is desired that the class be given.

The mechanism for periodically rotating the shaft 35, and for accomplishing the other operations hereinafter to be more fully described, is arranged within the casing 15 and between the partition 25 and the wall 19. For this reason, the shaft 35 is extended beyond the partition 25, being rotatable in an opening 55, formed in this partition. Likewise, the fins 40, are extended beyond the partition 25, these fins being slotted as at 56, to receive the said partition.

The mechanism for imparting a periodical or step by step rotation to the shaft 35, includes a motor 57, which may be supported by the bottom wall 18 of the casing. While this motor is shown as being an electric motor, it is obvious that the same might be a motor of any type desired, such for example as a spring motor. In any event the motor 57, drives a pinion 58, which meshes with a gear 59, secured to a shaft 60, journaled in suitable bearings arranged within the casing. The ratio between the gears 59 and 58 is such that the shaft 60 is rotated at a relatively slow speed as compared to the speed of the motor 57.

Slidably and rotatably mounted on shaft 60 are a plurality, preferably four, driving members 61, 62, 63 and 64 respectively. These driving members are preferably in the form of discs and the hub of each disc is provided with a keyway 65, adapted for engagement with a key 66, carried by the shaft 60. The discs 61 to 64 inclusive are adapted to be slid longitudinally of the shaft 60 whereby any one of the said discs may be keyed to the shaft and for accomplishing this the following structure is provided.

Figure 1:
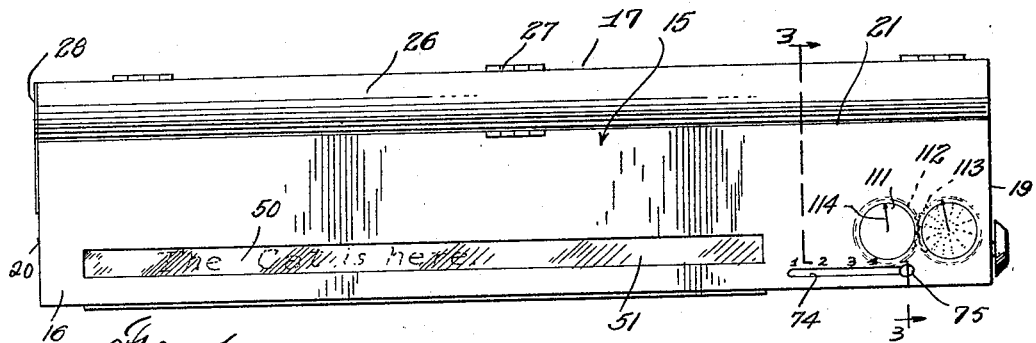
Figure 2:
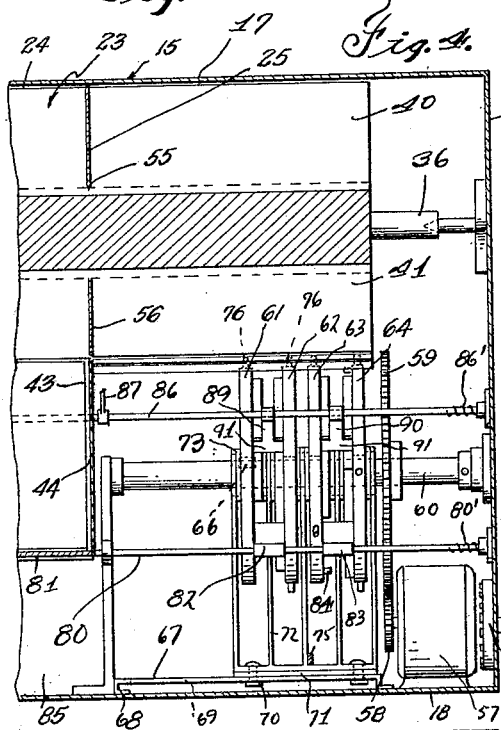
Figure 2 is an end elevational view of the device shown in Figure 1 but on a larger scale.
Figure 3:
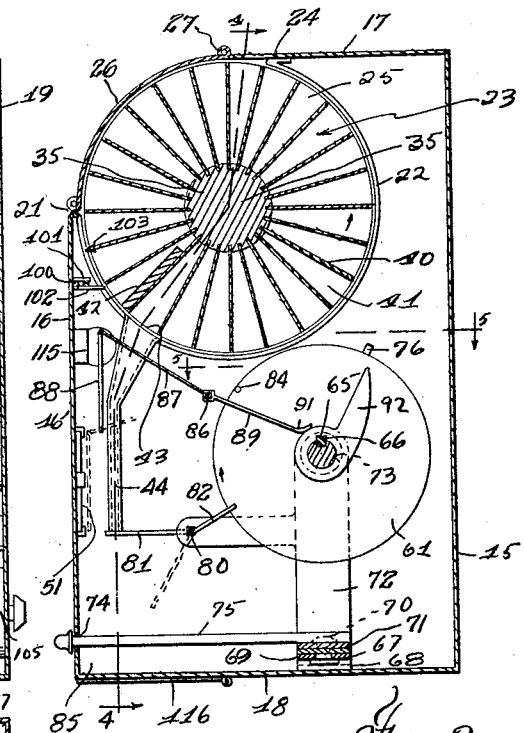
Figure 3 is a sectional view taken substantially on the line 3—3 of Figure 1 but on a larger scale.
Figure 5:
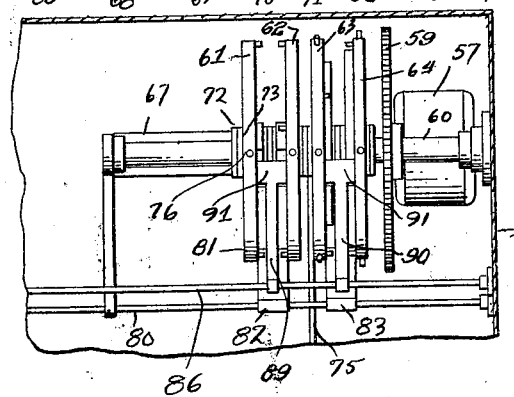
Figure 5 is a sectional view taken substantially on the line 5—5 of Figure 3.
Figure 2:
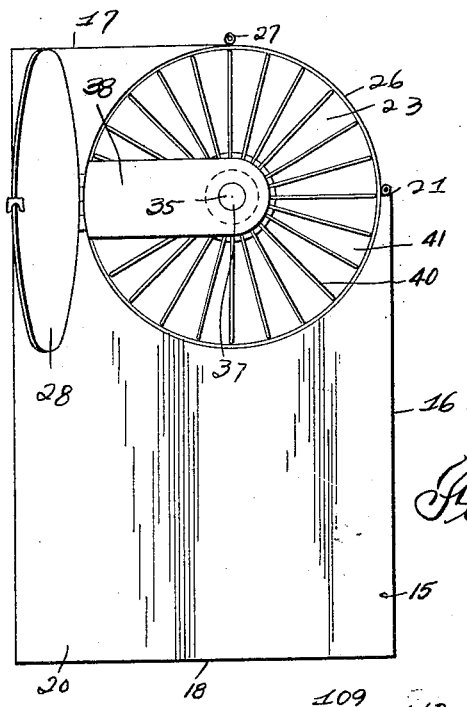

Fixed to the lower wall 18 of the casing, is a track like member 67, supported in spaced relation to ahe floor by the legs 68. This member is provided with the longitudinally extending slot 69, through which the bolts 70, of a slide member 71 extend. The member 71 is thus slidably mounted on the track 67 and this member is provided with the vertically extending arms 72, so arranged that one arm lies on each side of each of the said discs. The arms 72 are provided at their upper ends with the bosses 73, adapted to engage the hubs of the discs whereby movement of the slide will effect a corresponding movement of the discs. Projecting laterally from the slide 71 and through a slot 74 in the casing 15, is an arm 75 (see Figure 3), by which the said slide may be reciprocated from a point exterior of the casing. If desired, suitable indicia such for example, as the numerals 1 to 4 inclusive, may be placed above the slot 74 to indicate the position of the slide 71, and thus the position of the discs. Obviously, by movement of the lever 75, anyone of the discs 61 to 64 inclusive, may be rotatably coupled to the shaft 60, and since only one disc is coupled to the shaft at a time, the remaining discs will in each case be free to rotate on the shaft.

The discs 61 to 64 inclusive, are provided with the teeth 76 for engaging the extended ends of the fins 40, to rotate the shaft 35. The disc 61 is provided with one of these teeth while the disc 64 is provided with four of the teeth. The disc 62 and 63 are provided with two and three teeth respectively. The teeth and discs are so arranged that each tooth is adapted to advance the shaft sufficiently to bring one pocket into registration with the discharge slot 43 so that when the disc 61 is coupled to the shaft 60, one pocket 41 will be brought into registration with the slot 43 upon each complete revolution of the shaft 60. Obviously, if the disc 64 be coupled to the shaft 60, then four pockets will be successively brought into registration with the discharge slot 43 upon each revolution of the shaft 60. Thus, the invention provides means whereby either 1, 2, 3 or 4 of the pockets may be brought into registration with the discharge slot 43 upon each revolution of the shaft 60, dependent upon the position of the arm 75.

The invention further contemplates the provision of means for temporarily closing the sight opening 50 each time the shaft 35 is advanced one step together with means for temporarily supporting each card in a position whereby the same may be exposed through the said sight opening. Both of these mechanisms are actuated from the discs 61 to 64 inclusive and for accomplishing these results the following structure is provided.

Extending longitudinally of the casing 15 is a squared shaft 80 to which there is non-rotatably attached a door 81. This door or supporting member is adapted in its normal or closed position to extend substantially horizontally below the end of the guides 44 to thus support the card which is guided by these guide members in a position to be exposed through the sight opening 50. A spring 80' surrounds the shaft and tends to rotate the same in a direction to move the door 81 to the said supporting position. Slidably but non-rotatably secured to the shaft 80 are the fingers 82 and 83, adapted to project between the discs 61 and 62 and discs 63 and 64 respectively. Secured to the opposing faces of the discs 61 and 62 are the pins 84 while similar pins are secured to the opposing faces of the discs 63 and 64. These pins are adapted to engage the fingers 82 and 83 upon rotation of the discs to rock the shaft 80 and this rocking of the shaft will cause the door 81 to swing downwardly to the position shown in dotted lines in Figure 3 of the drawings, whereby the card supported before the sight opening will be permitted to drop into the compartment 85, arranged in the bottom of the casing.

It will be understood that the disc 61 which has a single tooth 76, will be provided with but a single pin 84, while the disc 64 which is provided with four teeth 60, will be provided with four such pins. The pins are so arranged with reference to the respective teeth that the door 81 will be rocked to open position a moment in advance of the engagement of the corresponding tooth with the fin 40 so that the card will be dropped from in front of the sight opening immediately before the next card is dropped from the pocket into position before the sight opening.

For temporarily closing the sight opening, there is provided a squared shaft 86, similar to the shaft 80. This shaft extends longitudinally of the casing and non-rotatably secured to this shaft are the arms 87 which pivotally support at their free ends the shutter 88. A spring 86', similar to the spring 80' tends to rotate the shaft in a direction to move the shutter 88 to the position shown in full lines in Figure 3 of the drawings. Slidably but non-rotatably fixed to the extended end of the shaft 86 are the fingers 89 and 90 which project between the discs 61 and 62 and 63 and 64 respectively. These fingers are provided with the widened ends 91 for engaging the cams 92, secured to the opposing faces of the discs 61 and 62, and the opposing faces of discs 63 and 64. The cam 92 fixed to the disc 61 has a single cammed surface 93, while the cam 92, secured to the disc 64 has four cammed surfaces 94. The arrangement is such that the cammed surfaces engage the widened ends of the fingers 89 and 90, dependent upon which disc is coupled to the shaft 60 to rock the shaft 86 to thus move the shutter 88 downwardly to a position in front of the sight opening 50. Obviously, when the disc 61 is coupled to the shaft 60, the shutter 88 will be moved only once during each revolution of the shaft 60, whereas when the disc 64 is coupled to the shaft 60, the shutter will be moved four times during each revolution of the shaft 60. The fingers 82 and 83, together with the fingers 89 and 90, being slidably mounted on their respective shafts will move with the discs when the latter are slid longitudinally of the shaft 60 to effect the coupling in the matter above brought out.

The invention further contemplates the provision of means for cutting off the supply of current to the electric motor 57 when all of the cards have been discharged from the rotatable card distributing member. To accomplish this, there is provided a switch 100, which is mounted in the circuit supplying current to the electric motor. This switch may be secured to the front wall of the casing and may include a rigid arm 101 carrying one contact point and a resilient arm 102 carrying the other contact point. The resilient arm is extended to a point adjacent the outer edges of the fins 40 and there is provided a clip 103 which may be clamped to the outer edge of any one of the fins for engaging the contact arm 102 to flex the same away from the contact arm 101.

Thus, when only a quarter of the pockets are filled with cards, the clip 103 will be secured to that fin defining the rear side of the last filled pocket. As the shaft 35 is rotated the clip 103 will break the contact through the switch 100 just as the last filled pocket is brought into registration with the discharge slot 43 and the last card is discharged from this pocket.

It is preferable to provide means, in addition to the several discs above described, for controlling the speed of rotation of the shaft 35. Accordingly, there is provided a rheostat 105 for regulating the speed of the electric motor 57. This rheostat, as illustrated, may be provided with 16 different contact points so that the motor may be run at 16 different speeds. Thus, great latitude may be had in the speed at which the cards are presented to the sight opening since the motor may be run at low speed and the disc 61 coupled to the shaft 60 to present but one card at each revolution of the shaft 60. On the other hand, the motor 57 may be run at the highest speed and the disc 64 coupled to the shaft 60 to present four cards to the sight opening upon each revolution of the shaft 60. It is obvious that the ratio of these parts may be varied as desired to give the desired speed of presentation of the cards.

For indicating the speed at which the cards are presented to the sight opening, there may be provided an indicating mechanism such as shown in Figure 10. This indicating mechanism includes a dial 106 provided with a circumferential series of markings for each position of the arm 75, and provided with a radial set of markings for each position of the knob on the rheostat 105. As illustrative of this system of marking, the first radial series of markings may read as follows: 1–5 min.; 2–5 min.; 3–5 min.; 4–5 min. The next radial series may read, —1–4 min.; 2–4 min.; 3–4 min.; 4–4 min. This marking is continued to provide 16 radial series so spaced as to cover the entire dial. A hand 107 is pivotally mounted as at 108 at the center of the dial and secured to this hand is an annular member 109 adapted when the hand 107 is moved over the dial to cover the portion of the dial over which the hand has moved. The member 109 is preferably formed of black celluloid and is divided on a radial line having one of its edges secured to the hand 107 and its other edge free. The dial 106 is slotted as at 110 whereby the member 109 may be drawn outwardly from its normal position in back of the dial 106 as the hand 107 is moved over the face of the dial.

In reading the indicating mechanism, when the arm 75 is positioned to its position under the number 4 over the slot 74, this indicates that the disc 64 is coupled to the shaft 60. If the rheostat is set at the second contact point, the hand 107 is moved to the second radial series of markings. The reading then is taken on the dial at the fourth circumferential series of markings from the center of the dial and at the second radial series of markings from the zero or normal position of the hand. Thus, the reading would be, "4–4 min."

Since the hand 107 is advanced over the face of the dial to correspond to the position of the knob of the rheostat, this hand may be connected to rotate with the hand of the rheostat in any desired manner (not shown). Thus, if the knob of the rheostat is moved to the sixteenth contact point, the hand 107 is simultaneously moved to the sixteenth radial series of markings. The dial 106 is designed to indicate speed at which the cards are placed before the sight opening and if desired there may be associated with this dial a second dial 111 for indicating the number of words passed before the sight opening. The dial 111 may be rotatably mounted and may be rotated by a gear 112 which meshes with gear 113 mounted on the shaft 108. A fixed indicating arm 114 may be provided for indicating the movement of the dial 111.

From the above it is believed that the structure and operation of the invention will be readily apparent. Any number of cards bearing the desired indicia and arranged in any desired order may be employed. These cards may be positioned in the pockets by opening the door 26 or by opening the door 28 and any number or all of the pockets may be filled as desired. With the desired number of pockets filled, the arm 75 is moved to couple the desired disc to the shaft 60 and the rheostat is then adjusted to give the desired speed to the motor 57. The shaft 60 being driven from the motor through the pinion 58 and gear 59 will drive that disc which is coupled to the same by the key 66. As the driven disc is rotated one of the pins 84 carried by the disc will first momentarily move the door 81 to card releasing position. Almost simultaneously the corresponding tooth 76 will engage one of the fins to rotate the shaft 55 a distance sufficient to bring one of the pockets into registration with the slot 43. At the same time the shutter 88 will be moved downwardly to temporarily close the sight opening while the card is being fed from the pocket to a position in front of the sight opening. As the shaft 35 is advanced with a step by step movement, each card will be temporarily positioned in a position to be exposed through the sight opening, will be temporarily supported in this position by the member 81 and will then be dropped from this position to the storage compartment 85. When all of the cards have been discharged from the pockets, the switch 100 will be opened to cut off the supply of current to the electric motor. Obviously the switch may again be closed by slightly rotating the shaft 35 by hand in order to move the clip 103 past the contact arm 102, whereupon the resiliency of the arm will return the switch to its closed position. A suitable light 115 may be provided within the casing for illuminating the cards positioned before the sight opening while a door 116 may be formed in the bottom of the casing to permit the removal of the cards from the storage pocket 85.

In Figure 11 a slightly modified form of construction is shown in which the shaft 35' is driven from a motor 57' by a worm 117 meshing with a gear 118 fixed to the said shaft. Otherwise, this form of construction is similar to that above described, the main distinction being that the shaft is driven directly from the motor without the clutch mechanism disclosed in the preferred form of the invention.

While the invention has been described as being embodied in an electrically driven device it will be readily apparent that the electric motor might be eliminated and the mechanism operated by hand. Obviously also, cards bearing indicia of any desired character may be used dependent entirely upon the type of lesson which the teacher desires to present to the class. If desired, switch 100 might be mounted in a position to be closed by the spring clip 103 to effect the ringing of a bell or the like to thus indicate to the class that the lesson is ended, in which event the automatic interruption of the electric circuit to the motor might be eliminated or accomplished in any other desired manner. The description, therefore, is not to be taken as definitive of the limits of the inventive idea, as the right is reserved to make such changes in the numerous details of construction and arrangement of parts as will fall within the purview of the attached claims.

What I claim as my invention is:

1. An educational appliance including a movable member adapted to loosely receive a plurality of indicia bearing cards, means for moving said member to successively periodically discharge said cards from the same, means for temporarily supporting each card after it is discharged from the said member to temporarily expose the indicia on the same, and means for moving said supporting means to release the card after a predetermined exposure thereof.

2. An educational appliance including a casing having a sight opening, means for supporting a plurality of cards within said casing, means for successively discharging said cards from said supporting means toward said sight opening, means for temporarily supporting each card adjacent said sight opening to temporarily expose the same through said sight opening, and means for periodically moving said supporting means to release the card after a predetermined exposure thereof.

3. An educational appliance including a casing having a sight opening, a supporting member adjacent said sight opening for supporting a card in a position to be exposed through said sight opening, means for successively positioning cards on said supporting member, and means for periodically moving said supporting member to discharge the card supported thereby.

4. An educational appliance including a casing having a sight opening, a member having a plurality of card receiving pockets rotatably mounted in said casing, means for rotating said member to successively discharge the cards from said pockets to a point adjacent said sight opening for exposure therethrough, and adjustable means for stopping the operation of said rotating means when all of the cards have been discharged from said pockets.

5. An educational appliance including a casing having a sight opening, a member having a plurality of card receiving pockets rotatably mounted in said casing, means including a motor for rotating said member to successively discharge the cards from said pockets to a point adjacent said sight opening for exposure therethrough, and adjustable means for interrupting the operation of said motor when all of the cards have been discharged from said pockets.

6. An educational appliance including a casing having a sight opening, means for temporarily supporting a card adjacent the sight opening for exposure therethrough means for successively supplying cards to said supporting means, means for moving said supporting means to release the card after a predetermined exposure thereof, and means for closing said sight opening during the intervals when the cards are being positioned adjacent said sight opening.

7. An educational appliance including a casing having a sight opening, a platform adjacent said sight opening for supporting a card in position for exposure through said sight opening, means for successively feeding a plurality of cards to said platform, means for periodically moving said platform to permit each card to drop away from said sight opening after the same has been exposed for a predetermined time, and a shutter for closing said sight opening when said platform is moved to card releasing position.

8. An educational appliance including a casing having a sight opening, a shaft within said casing, fins arranged radially of said shaft to form a plurality of card receiving pockets, a casing surrounding said fins to close the outer ends of said pockets, said casing having a slot adapted to successively register with each pocket upon a periodic rotation of the said shaft whereby the cards may be individually discharged from the said pockets, and means for rotating the said shaft with a step by step movement, said means including a motor, a plurality of disks, said disks having variable numbers of teeth adapted for engagement with said fins to rotate said shaft, and means for selectively coupling any one of said disks to said motor.

9. An educational appliance including a casing having a sight opening, means associated with the casing for supporting a plurality of cards, means for successively discharging said cards from said supporting means toward said sight opening, means for supporting each card adjacent said sight opening to expose the same through said sight opening, and means for moving said supporting means to release the card after the same has been exposed for a predetermined time.

10. An educational appliance comprising a casing having a sight opening, a rotatable member in the casing having a plurality of radially extending card receiving pockets, a casing surrounding said member to close the outer ends of said pockets, said casing having a slot adapted to successively register with each pocket upon a periodic rotation of said member whereby the cards may be individually discharged from said pockets to a position registering with said sight opening for exposure therethrough, and means for periodically rotating said member including a motor, a disk, and means for clutching said disk to said motor for rotation thereby.

In testimony whereof I affix my signature.

FLORENCE M. STADER.